United States Patent [19]
Pfister

[11] Patent Number: 5,575,527
[45] Date of Patent: Nov. 19, 1996

[54] FASTENING DEVICE FOR A DECORATIVE OR COVER STRIP

[75] Inventor: Klaus Pfister, Maulbronn, Germany

[73] Assignee: Dr. Ing. h.c.F. Porsche AG, Weissach, Germany

[21] Appl. No.: 553,758

[22] Filed: Oct. 23, 1995

[30] Foreign Application Priority Data

Oct. 21, 1994 [DE] Germany ........................ 44 37 687.1
Jun. 16, 1995 [DE] Germany ....................... 195 21 862.0

[51] Int. Cl.⁶ ................................................. B60R 13/02
[52] U.S. Cl. ........................ 296/213; 296/210; 52/716.5; 52/718.01
[58] Field of Search .................................. 296/210, 213; 52/716.5, 718.01, 716.6, 716.8; 248/503, 231.31, 316.2

[56] References Cited

U.S. PATENT DOCUMENTS

| 4,930,279 | 6/1990 | Bart et al. ............................ 52/466 |
| 5,193,322 | 3/1993 | Wood .............................. 52/718.01 |
| 5,413,398 | 5/1995 | Kim ................................... 296/210 |

FOREIGN PATENT DOCUMENTS

| 2391387 | 12/1978 | France . |
| 2637951 | 4/1990 | France . |
| 2680737 | 4/1991 | France .............................. 296/210 |
| 3110989 | 9/1982 | Germany . |
| 3230317 | 11/1983 | Germany . |
| 62-283032 | 5/1986 | Japan ................................. 296/210 |
| 4-252752 | 1/1991 | Japan ................................. 296/210 |

Primary Examiner—David M. Mitchell
Assistant Examiner—Jonathan J. Yun
Attorney, Agent, or Firm—Evenson, McKeown, Edwards & Lenahan, P.L.L.C.

[57] ABSTRACT

A fastening device for a decorative or cover strip for gaps in motor vehicle bodies, has a holding body which can be inserted and wedged into the gap and which holds the decorative or covering strip. The holding body made of several parts includes lateral bracing elements, which can be braced against lateral walls of the gap via a spreading element. The spreading element is provided between the bracing elements and is displaceable in the longitudinal direction of the gap. The decorative or cover strip can be fixed on the spreading element. In this manner, the decorative or cover strip can always be fastened centered, regardless of tolerance-related fluctuations of the gap width.

21 Claims, 4 Drawing Sheets

FASTENING DEVICE FOR A DECORATIVE OR COVER STRIP

BACKGROUND AND SUMMARY OF THE INVENTION

The invention relates to a fastening device for a decorative or cover strip for gaps in motor vehicle bodies. The fastening device has a holding body which can be inserted and wedged into the gap and holds the decorative or covering strip.

A fastening device of the above mentioned type is described in German Patent document DE 31 10 989 including a holding body which can be wedged and is inserted into a gap between the main sheet metal panel of the top and the lateral top spar of the vehicle. This holding body consists of two wedge-shaped elements which are displaceable against one another along a common, transversely extending separating face. In the process of being displaced against one another, the elements become wedged against the lateral walls of the gap. A holder for a decorative or cover strip is provided in one of these two elements.

It is a disadvantage of the known fastening device that in the event of fluctuations of the gap width due to manufacturing tolerances, the holder for the decorative or cover strip has a constant distance only towards one side of the gap, namely the side of the gap against which the element receiving the holder rests. A centered alignment of the decorative or cover strip along the longitudinal extent of the gap is therefore not possible.

There is therefore needed a fastening device designed in such a way that the decorative or cover strip can always be fastened so as to be exactly centered, regardless of tolerance-related fluctuations of the gap width.

There is furthermore needed a fastening device which can be produced in a cost-effective manner, which can be quickly and simply mounted, and which provides a secure holding of the cover strip.

These needs are met according to the present invention by a fastening device for a decorative or cover strip for gaps in motor vehicle bodies. The fastening device has a holding body which can be inserted and wedged into the gap and which holds the decorative or covering strip. The holding body is made of several parts including lateral bracing elements, which can be braced against lateral walls of the gap via a spreading element. The spreading element is provided between the bracing elements and is displaceable in the longitudinal direction of the gap. The decorative or cover strip is fixed on the spreading element.

Advantages of the present invention include providing a holding body which can be produced cost-effectively and can be inserted rapidly and securely into a gap of a vehicle body so as to assure an accurately centered fastening of a decorative or cover strip.

The top gap is a typical gap found in most vehicle bodies. An approximately rectangular gap, which extends over the entire length of the vehicle top, is formed between the main sheet metal panel of the top and the lateral top spar. So-called holding bodies are inserted into the gap at defined distances. The holding bodies have a longitudinal groove for a strip which caps or covers the gap. These holding bodies can be fastened in the top gap via lateral bracing.

Because of manufacturing tolerances, the gap width is not uniform over its entire length. If the longitudinal groove for the decorative or cover strip is fastened to a part of the holding body resting against the gap wall, then the longitudinal groove is moved away from the other gap wall in accordance with the fluctuation in the gap width. To assure that the longitudinal groove for the decorative or cover strip in the holding body is always exactly in the center of the gap, regardless of the gap width, the holding body is constructed of several parts, namely a part located in the center with a receptacle for the decorative or cover strip, and further parts disposed symmetrically next to the center part. These further parts brace the holding body against the gap wall. The bracing function can be performed by pushing wedge-shaped partial elements together. The wedge angle of the wedge-shaped partial elements can be selected to be such that self-locking of the parts takes place and, therefore they no longer come apart. However, the provision of serrations on the separating faces of the holding body is also possible.

An embodiment of the holding body formed in three parts has proven to be advantageous, wherein a spreading element is disposed so as to be displaceable between two symmetrical lateral bracing parts. By means of this arrangement, it is assured that the decorative or cover strip fastened on the spreading element always comes to rest centered in the top channel.

In a further preferred embodiment, the bracing parts can have a limit stop on their wider front. The limit stop extends respectively crosswise to the longitudinal extension of the gap. The limit stop is in operative connection with a step-shaped impression of the oppositely located bracing part. The position of the bracing parts in relation to each other is therefore clearly defined.

In further preferred embodiments, the lateral bracing parts can be connected with the center spreading element through the use of sliding guides extending in the longitudinal direction, so that they cannot be separated, although the individual parts can be displaced against each other. The three-piece holding body can therefore be preassembled to form a structural unit. This structural unit is then inserted into the top gap and braced in the top gap by pushing it together in the longitudinal direction.

In addition, a base on the centered spreading element extending in the direction toward the gap bottom assures that channels for the run-off of rainwater remain free in the top gap between the holding body and the gap bottom. This base further assures that all holding bodies inserted into a top gap have the same distance from the gap bottom.

In a further preferred embodiment, an undercut of the lateral gap walls extending toward the bottom of the top gap increases the secure anchoring of the holding body in the top gap.

Advantageously, the receptacle for the decorative or cover strip on the spreading element can be applied centered or off-centered, depending on the design of the decorative or cover strip. Fastening can be performed directly or with the interposition of an additional receiving element, such as a metal holding clip. The receptacle is constituted, for example, by a recessed longitudinal groove or upwardly projecting formed-on snap hooks.

Still further, the decorative or cover strip can be maintained in its position by the interposition of an adapter at the spreading element. The adapter is inserted into the decorative or cover strip and constitutes a pre-assembled unit together with it, which is clipped to the holding body.

Other objects, advantages and novel features of the present invention will become apparent from the following detailed description of the invention when considered in conjunction with the accompanying drawings.

DETAILED DESCRIPTION OF THE DRAWINGS

Figure 1:
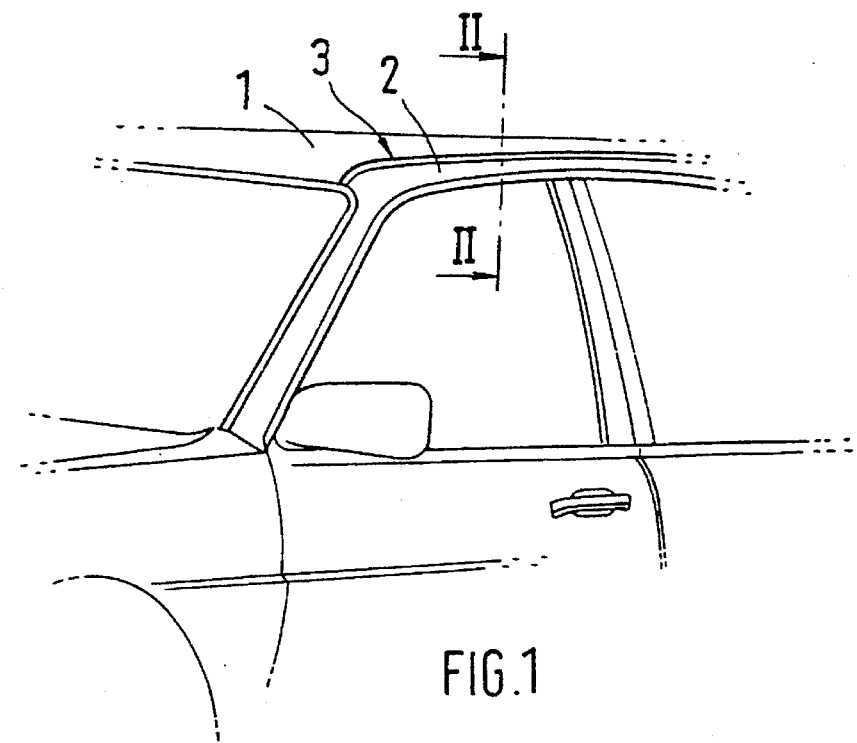
FIG. 1 is a perspective lateral partial view of a motor vehicle with a top gap.
Figure 2:
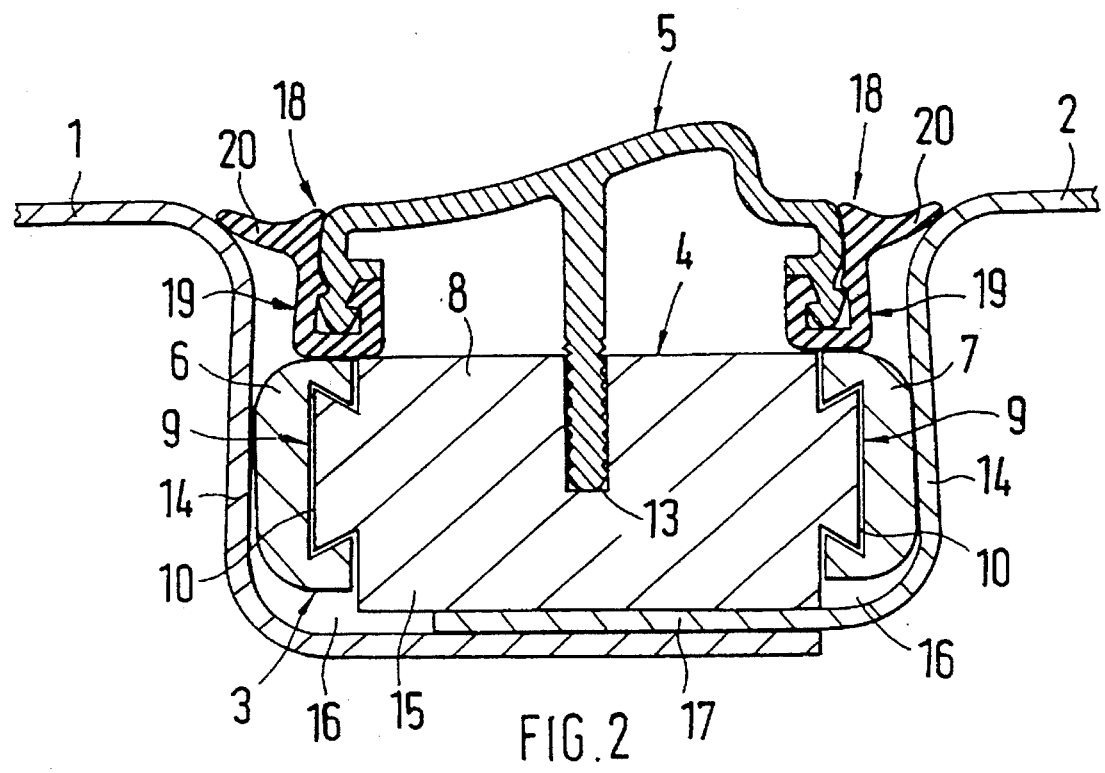
FIG. 2 is a sectional view of the top gap taken along the line II—II in FIG. 1.

A part of a motor vehicle is represented in a perspective view in FIG. 1, wherein a gap 3 extending over the entire length of the top is provided between the main sheet metal panel of the top 1 and the lateral top spar 2. In FIG. 2, a section view taken along the line II—II shows a cross section of the top gap 3 and a holding body 4 inserted therein, on which the decorative or cover strip 5 is fastened.

As can be further seen from FIG. 2, the lateral walls 14 of the top gap 3 are undercut toward the bottom in order to assure an improved wedging effect and thus improved fastening of the holding body 4. At the bottom, a spreading body 8 of the holding body 4 has a base 15 which forms two free channels 16 underneath the holding body 4, through which rainwater can flow-off. This base 15 furthermore assures that all holding bodies 4 inserted into the top gap 3 have the same distance from the top gap bottom 17.

Figure 3:
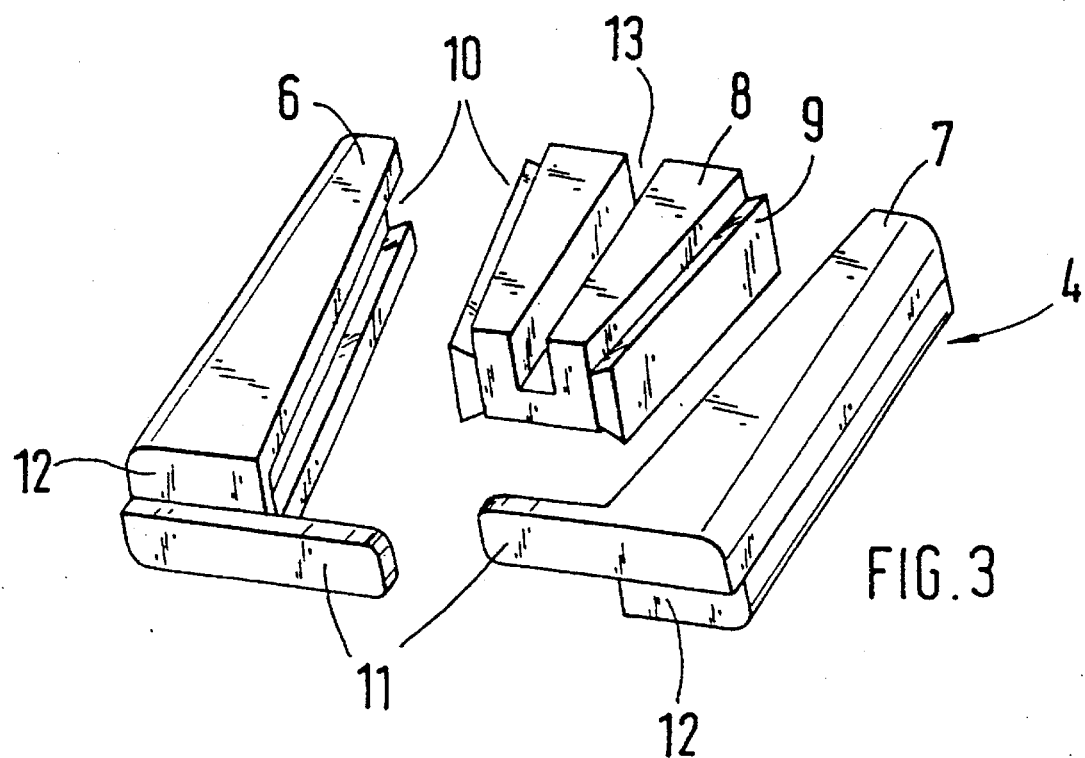
FIG. 3 is a perspective view illustrating the individual parts of the holding body according to the invention.

Details of the holding body 4 can be seen in FIG. 3. The holding body 4 is constructed in three parts. It comprises two symmetrical, wedge-shaped bracing elements 6, 7 disposed to the left and right, which in the finished position have an identical shape, and of a wedge-shaped spreading element 8 disposed in the center and displaceable in the longitudinal direction between the bracing elements 6, 7. Depending on the position of the spreading element 8 between the bracing elements 6, 7, the latter are more or less pushed apart.

The lateral bracing elements 6, 7 are connected with the centered spreading element 8 by means of longitudinally-oriented sliding guides 9, for example by means of a so-called dovetailed guide 10. Of course, other guides could be used.

Serrations 50 (FIG. 7) can be provided between the spreading element 8 and the respectively adjoining bracing element 6, 7 in the area of the sliding guides 9. However, with an appropriately narrow angle between the bracing elements 6, 7 and the spreading element 8, a roughened or eroded (course) surface between the two elements is sufficient for self-locking the components in the braced state.

On their wider front ends, the bracing elements 6, 7 each have a limit stop 11 extending transversely to the longitudinal extension of the gap 3. The limit stops 11 are in operative connection with a step-shaped impression 12 of the oppositely located bracing element. By means of this arrangement, the reciprocal position of the bracing element 6, 7 is unequivocally fixed, so that the spreading element 8 always comes to rest centered between the two elements 6, 7. Both bracing element 6, 7 are evenly moved outward during the displacement of the spreading element 8 in the longitudinal direction, so that the automatic centering of the spreading element 8 inside the gap 3 takes place.

A longitudinal groove 13 is cut into the spreading element 8. The groove 13 can be disposed so as to be centered or off-center. Fastening of the decorative or cover strip 5 takes place directly in the longitudinal groove 13. It is also possible to additionally push a receiving element 52 into the longitudinal groove 13, which holds the decorative or cover strip 5.

Figure 4:
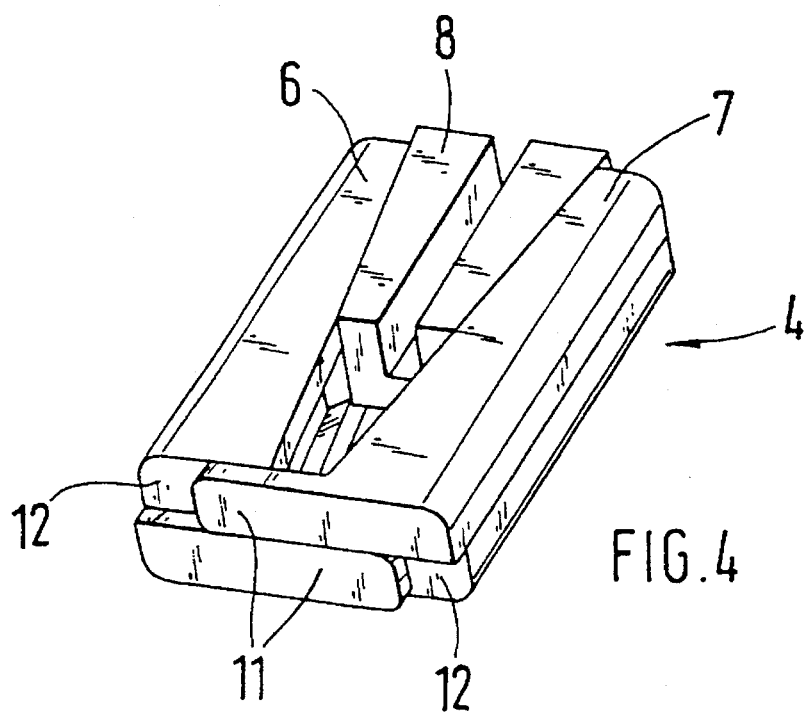
FIG. 4 represents a pre-assembled holding body according to the invention ready for insertion.

FIG. 4 shows a pre-assembled holding body 4, wherein the bracing elements 6, 7 with the spreading element 8, in sliding connection via the dovetailed guide 10, constitute a structural unit. The function of the limit stops 11 is clearly visible here. The limit stops 11 maintain the bracing elements 6, 7 in a steady position by the mutual contact with their step-shaped impressions 12.

When installing the holding body 4 into the top gap 3, the pre-assembled structural unit in accordance with FIG. 4 is inserted into the top gap 3 and compressed at the front end by means of a tool, so that the spreading element 8 is pushed between the bracing elements 6, 7, and the bracing elements 6, 7 are braced against the lateral walls 14 of the top gap 3 and in this way fix the holding body 4 in place in the top gap. Fastening of the decorative or cover strip 5 in the longitudinal groove 13 takes place thereafter.

In accordance with FIG. 2, the decorative or cover strip 5 is provided on its two lateral edges with pushed-on weatherstripping 18, which respectively has a receiving section 19 and a sealing lip 20.

If required, serrations or ribbing, not shown in detail, can be provided on the top of the bracing elements 6, 7, so as to be in operative connection with the underside of the adjoining receiving section 19 of the weatherstripping.

Figure 5:
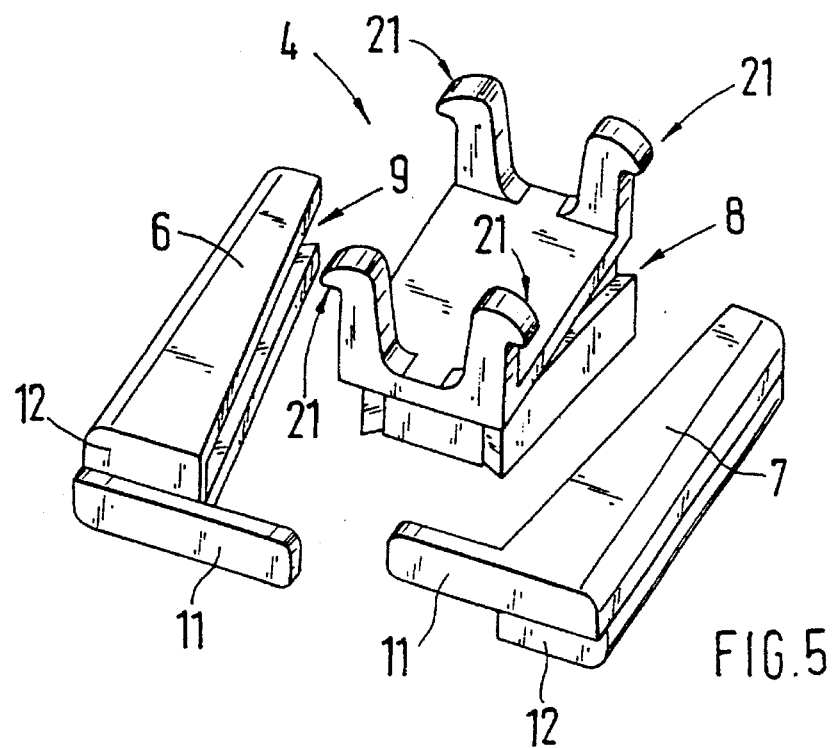
FIG. 5 is a perspective view of the individual parts of a second embodiment of a holding body according to the invention.
Figure 6:
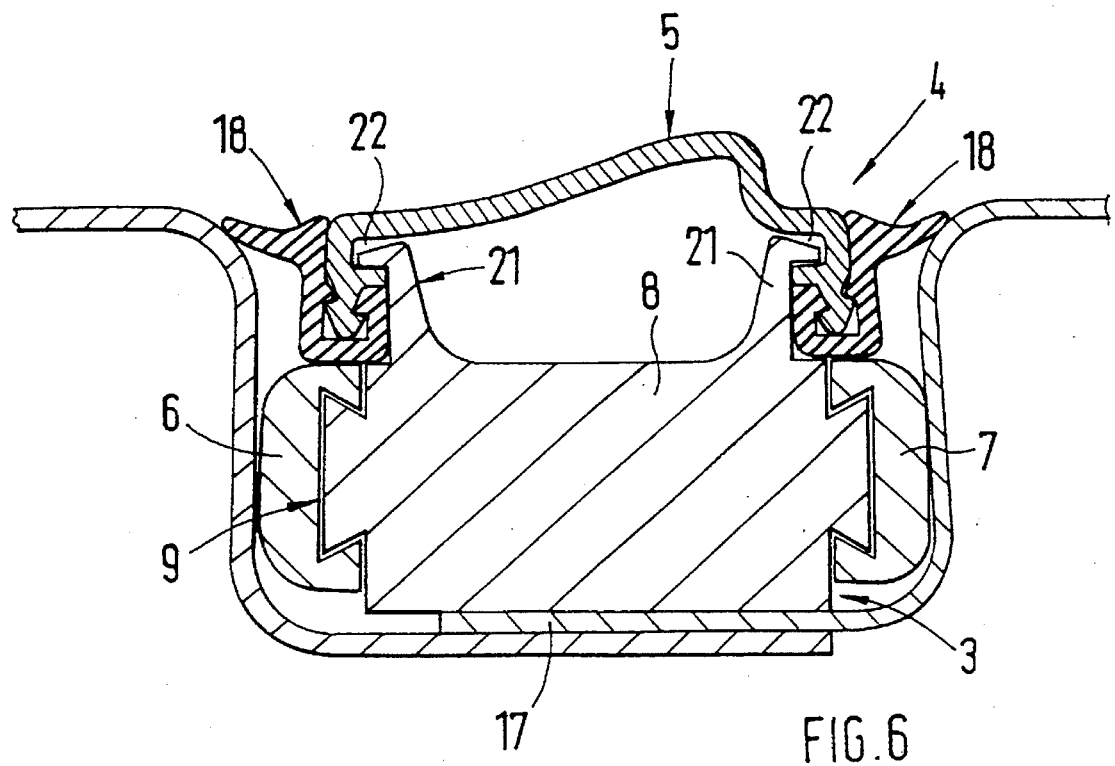
FIG. 6 is a section view taken through the holding body of FIG. 5 in the area of the formed-on snap hooks.

FIGS. 5 and 6 show a second embodiment of a holding body 4, also composed of lateral bracing elements 6, 7 and a centered spreading element 8. This embodiment only differs in the design of the holder for the decorative or cover strip 5.

In accordance with FIGS. 5 and 6, locally upward-pointing snap hooks 21 are formed on the spreading element 8 in place of the longitudinal groove 13. The snap hooks 21 cooperate lockingly with undercut edge areas 22 of the decorative or cover strip 5. The snap hooks 21 are embodied to be resilient in the transverse direction.

According to FIG. 5, four snap hooks 21 are provided for fixing the decorative or cover strip 5 in place. However, it is also possible to dispose more or fewer snap hooks 21 on the spreading element 8.

Figure 7:
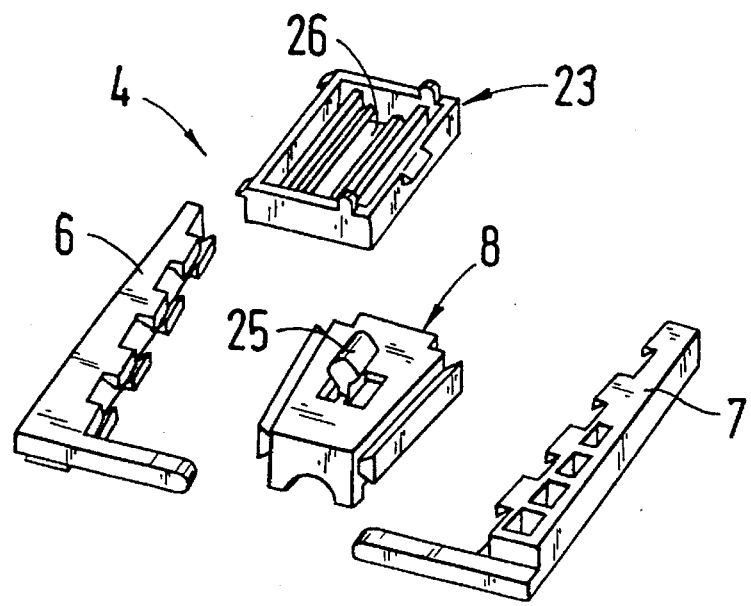
FIG. 7 is a perspective view of the individual parts of a third embodiment of a holding body according to the invention.
Figure 8:
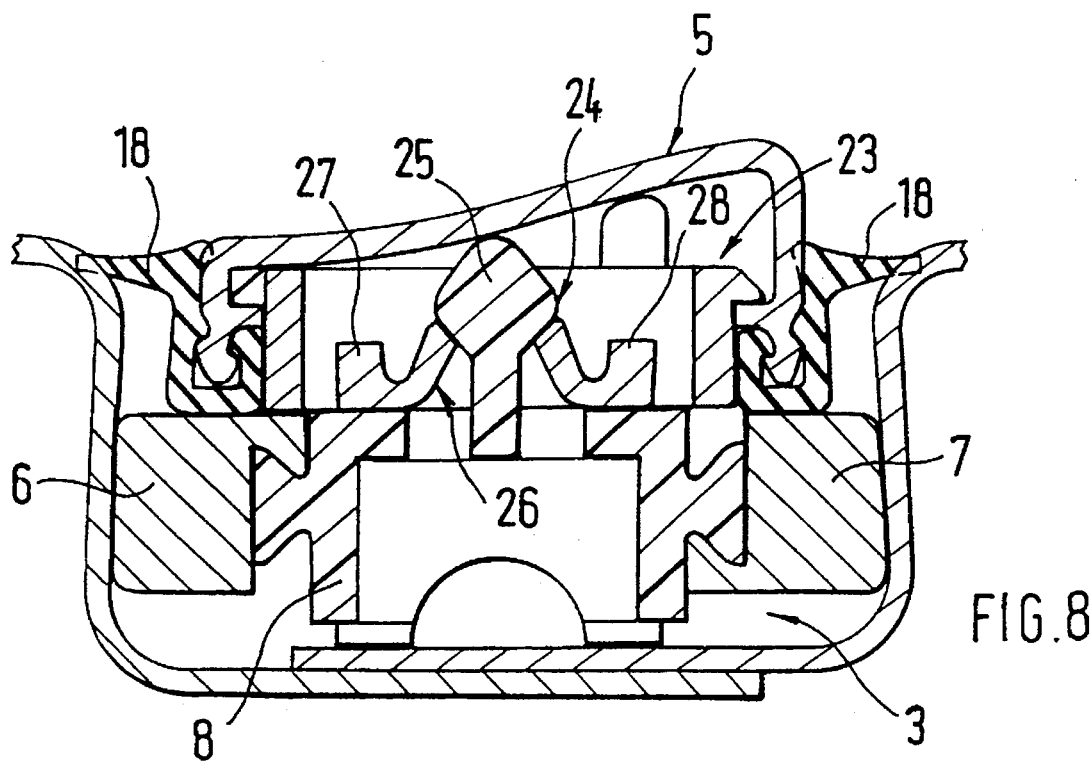
FIG. 8 is a section view taken through the holding body of FIG. 7 in the area of the clip connection between the adapter and the decorative or cover strip.

A third embodiment of a holding body 4 is represented in FIGS. 7 and 8.

This holding body 4 is also composed of lateral bracing elements 6, 7 and a centered spreading element 8. Here, the holding of the decorative or cover strip in place does not take place directly on the spreading element 8, but rather with the interposition of an adapter 23 as an intermediate piece. The adapter 23 is inserted into the decorative or cover strip 5. This is accomplished by means of clips or by lateral insertion.

In accordance with FIG. 8 the adapter 23 cooperates in an interlocking manner with the decorative or cover strip 5 surrounding it. When mounting the holding body 4, the decorative or cover strip 5, together with the inserted adapters 23, constitutes a pre-assembled structural unit.

Each adapter 23 cooperates with a corresponding spreading element 8 via a clip connection 24. The clip connection 24 is composed of a formed-on, projecting, mushroom-shaped piece 25 and an associated receptacle 26.

In the exemplary embodiment shown, the mushroom-shaped piece 25 is formed starting at the surface of the spreading element 8, while the receptacle 26 is provided on the adapter 23. The receptacle 26 is formed by two profiled bars 27, 28, which are formed at a distance from each other on the approximately rectangular adapter 23, wherein the longitudinally extending bars 27, 28 extend at a distance away from the longer outer wall sections of the adapter 23 and are connected to the shorter, transversely extending wall sections.

In accordance with FIG. 7, the receptacle 26 has a considerably greater longitudinal extent than the length of the mushroom-shaped piece 25 (tolerance compensation). However, the mushroom-shaped piece 25 can also be formed on the underside of the adapter 23 and the receptacle can be formed on the spreading element 8.

With the decorative or cover strip installed, the adapter 23 rests on the top of the spreading element 8.

The embodiment of the holding body 4 in accordance with the invention is not limited to a top gap, but can be employed with any arbitrary gaps of the vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fastening device for a cover strip for a gap having a longitudinally extending gap length in a motor vehicle, comprising:
    a holding body inserted and wedged into the gap for holding the cover strip, the holding body comprising several parts including first and second lateral bracing elements, each of which brace against a lateral wall of the gap, and a spreading element arranged between the first and second lateral bracing elements and being displaceable in a direction of the gap length for bracing said first and second lateral bracing elements against the lateral walls, and further wherein said spreading element includes a fastener for the cover strip.

2. A fastening device according to claim 1, wherein the holding body is formed of three parts, the spreading element being displaceably disposed between the first and second lateral bracing elements which are symmetrical.

3. A fastening device according to claim 1, wherein the first and second lateral bracing elements have a wedge-shape, and wherein the spreading element has a wedge-shape including exterior walls extending in parallel to an associated inner wall of the first and second lateral bracing elements.

4. A fastening device according to claim 1, wherein said first and second lateral bracing elements have identical shapes in a finished position.

5. A fastening device according to claim 1, wherein said first and second lateral bracing elements have a wedge-shape with a limit stop on a wide front end, said limit stop extending transversely to a longitudinal extent of the gap, and wherein said limit stop is in operative connection with a step-shaped impression formed on an oppositely located one of said first and second lateral bracing elements.

6. A fastening device according to claim 1, wherein said first and second lateral bracing elements cooperate with the spreading element which is centered with the first and second lateral bracing elements via longitudinally oriented sliding guides.

7. A fastening device according to claim 6, wherein said longitudinally oriented sliding guides are dovetailed guides.

8. A fastening device according to claim 6, further comprising serrations provided between and on one of said spreading element and an adjoining one of said first and second bracing elements in an area of the sliding guides.

9. A fastening device according to claim 7, further comprising serrations provided between and on one of said spreading element and an adjoining one of said first and second bracing elements in an area of the sliding guides.

10. A fastening device according to claim 6, wherein cooperating exterior surfaces of the first and second bracing elements and the spreading element have one of a roughened and eroded surface in an area of the sliding guides.

11. A fastening device according to claim 7, wherein cooperating exterior surfaces of the first and second bracing elements and the spreading element have one of a roughened and eroded surface in an area of the sliding guides.

12. A fastening device according to claim 1, wherein said spreading element includes a longitudinal groove into which a profiled base section of the cover strip is inserted.

13. A fastening device according to claim 12, further comprising an additional receiving element for holding the cover strip, said receiving element being inserted into the longitudinal groove.

14. A fastening device according to claim 1, wherein said spreading element includes a base which rests on a top channel bottom surface so as to form rainwater run-off channels underneath the holding body.

15. A fastening device according to claim 1, wherein said first and second bracing elements and said spreading element form a preassembled structural unit prior to installation in the gap.

16. A fastening device according to claim 15, wherein an additional receiving element is formed into said preassembled structural unit.

17. A fastening device according to claim 1, wherein said spreading element includes upwardly projecting resilient snap hooks which lockingly cooperate with the cover strip.

18. A fastening device according to claim 1, further comprising an adapter for maintaining the cover strip in position on the spreading element.

19. A fastening device according to claim 18, wherein the adapter is inserted into the cover strip, and further wherein the adapter and the spreading element cooperate via a clip connection.

20. A fastening device according to claim 19, further comprising a mushroom-shaped piece formed on one of the adapter and spreading element, said mushroom-shaped piece engaging a receptacle of the opposite one of said adapter and spreading element by locking-in said receptacle, and further wherein said receptacle provides a substantially greater longitudinal extent than a longitudinal extent of the mushroom-shaped piece.

21. A fastening device according to claim 18, wherein the adapter rests on a top of the spreading element.

* * * * *